Patented Apr. 18, 1939

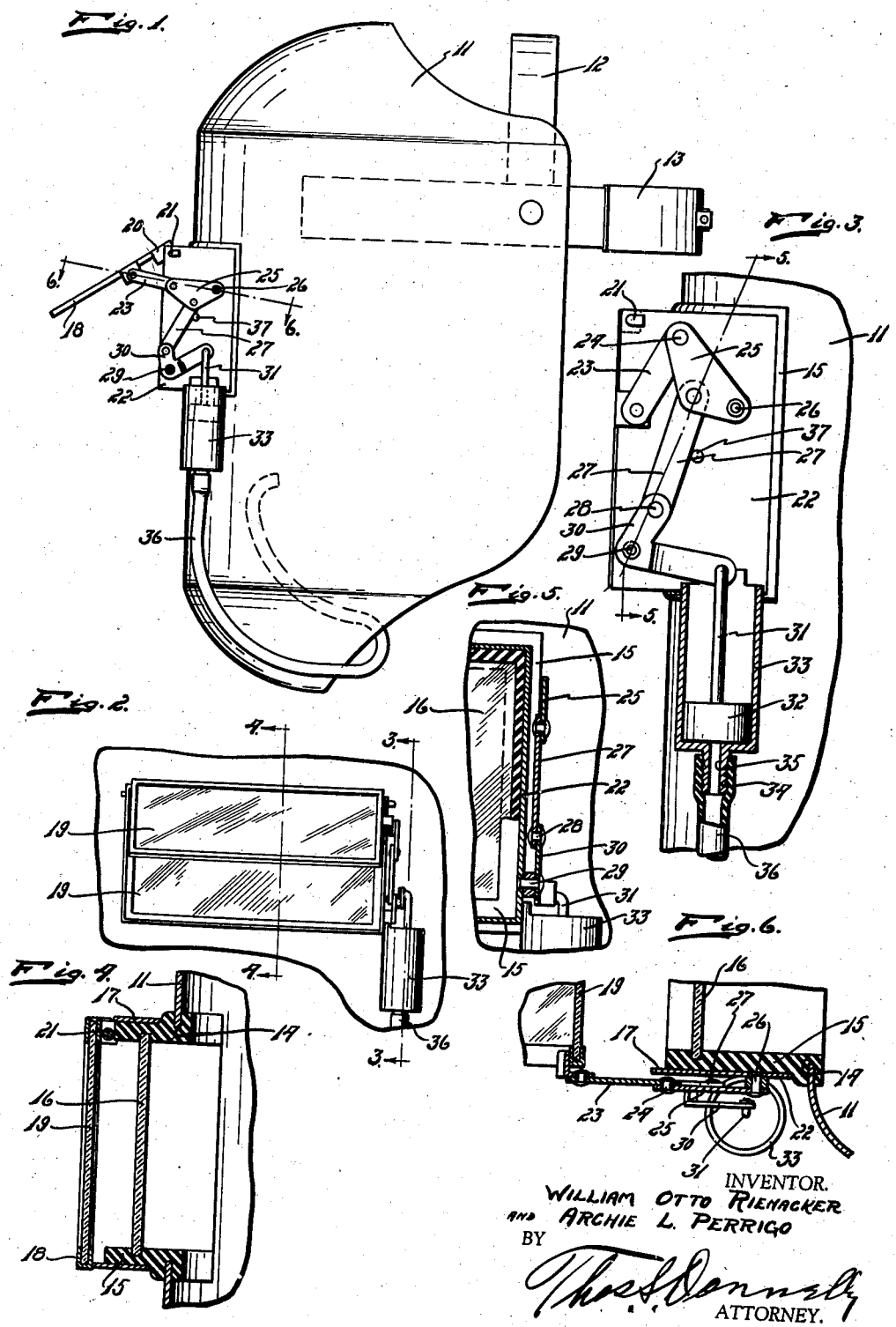

2,154,774

UNITED STATES PATENT OFFICE 2,154,774

WELDING HOOD SHIELD

William Otto Rienacker, Detroit, and Archie L. Perrigo, Armada, Mich.

Application May 19, 1937, Serial No. 143,550

7 Claims. (Cl. 2—8)

Our invention relates to a new and useful improvement in a welding hood shield, and particularly relates to a vizor commonly used on these hoods.

It is an object of the present invention to provide in a welding hood a vizor or shield whereby the operator may easily and quickly move to operative or inoperative position a light screening shield so as to protect the eyes from the glare of the flash present in welding operations.

It is another object of the present invention to provide a device whereby the operator, without the use of his hands, may move a shield device to operative and inoperative position.

Another object of the present invention is the provision in a device of this class of mechanism whereby the operator, by drawing inwardly or blowing outwardly on a tube, may effect the operation of the device so as to move the shield from one position to the other.

Another object of the present invention is the provision in a device of this class of a shield operating mechanism which will be simple in structure, economical of manufacture, durable, compact, light, and easily and quickly operated.

Another object of the present invention is the provision in a device of this class of mechanism so constructed and arranged that a movable mounted shield may be moved to shielding position and locked in this position and easily and quickly moved to non-shielding position and locked in this position.

Other objects will appear hereinafter.

The invention consists in the combination and arrangement of parts hereinafter described and claimed.

The invention will be best understood by a reference to the accompanying drawing which forms a part of this specification and in which—

Fig. 1 is a side elevational view of a welding hood showing the invention applied.

Fig. 2 is a fragmentary front elevational view.

Fig. 3 is a view taken on line 3—3 of Fig. 2 slightly enlarged.

Fig. 4 is a sectional view taken on line 4—4 of Fig. 2.

Fig. 5 is a sectional view taken on line 5—5 of Fig. 3.

Fig. 6 is a view taken on line 6—6 of Fig. 1.

The welding hood 11 is provided with the usual retaining loops 12 and 13 which fit over the head of the user. In this welding hood is an opening 14 over which is mounted a supporting frame 15 carrying the transparent pane of glass 16. This transparent pane of glass 16 serves as a protection to the eyes of the user when the shielding frame is moved to non-shielding position. Mounted on this supporting frame is an embracing frame 17, formed preferably from metal and projecting at its side walls and bottom wall forwardly of the supporting frame 15, as clearly appears in Fig. 6. A shield frame 18 is provided on which is mounted a shielding or protective plate 19 of colored or smoked glass which serves as a light filter so that when the plate 19 is lowered into the position shown in Fig. 4, it will serve as a protection to the eyes of the operator. While the welding operation is being carried on, the protective plate or shield 19 will be lowered into the position shown in Fig. 4. The frame 19 is pivotally mounted on the wire 21 which is extended through the side walls 22 of the frame 17 and through the inwardly projecting lugs 20 carried by the frame 18. Pivotally connected at one side of the frame 18 to the frame 20 is one end of a toggle link 23, the opposite end of which is pivotally connected at 24 to another toggle link 25 which is pivotally connected at 26 to the embracing frame 17. An operating link 27 is pivotally connected at one end to the toggle link 25 intermediate its ends. The opposite end of the link 27 is pivotally connected as at 28 to one end of a rocker arm 30, which is pivoted at 29 to the embracing frame 17. The opposite end of the rocker arm 30 is connected to the rod 31 projecting outwardly from the piston 32 which is slideably mounted in the cylinder 33 to form a snug and leak proof engagement therewith. The cylinder is provided with a nipple 34, having the central passage 35 therein, so as to establish a communication of the tube 36 with the interior of the cylinder 33. This tube 36 is mounted on the nipple 34 in embracing relation and is of sufficient length to reach the mouth of the operator when the hood is mounted in position.

The construction is such that when the operator blows through the tube 36, the piston 32 will be moved upwardly into the position shown in Fig. 1 so as to rock the rocker arm 30 and straighten out the toggle embodying the links 23 and 25. This rocking will move the toggle beyond center, upon which the link 27 will engage the abutment stud 37 and thus the device will be locked in outwardly moved or inoperative position as shown in Fig. 1. This will permit the operator a clear view, through the clear glass 16, of the work-piece and when it is desired to lower the plate 19 to operative or shielding position, the operator would suck or draw on the tube 36 which would pull the piston 32 downwardly into the position shown in Fig. 3, and rock the various parts to effect a movement of the plate 19 into the position shown in Fig. 4. When the plate 19 is lowered to operative position as shown in Fig. 3, the toggle links 30 and 27 will be so moved as to be moved past center thus locking the plate 19 in shielding position. This is an important feature, as it permits the frame to be locked in shielding position by the force of gravity, so that should the operator fail to effect sufficient force to move the frame 19 to fully closed position, the weight of the frame swinging downward would effect a breaking of the toggle embodying the links 27 and 30 to lock the plate in shielding position.

Thus, it is obvious that the operator is not required to use his hands in operating the shielding device and that the device may be moved from one position to another without requiring the removal of the operator's hand from the work-piece.

In the form illustrated, we have shown a pneumatically operated mechanism and of course this mechanism may be operated by the operator blowing or sucking through the tube 36, or effecting the necessary pneumatic action by the means of a bulb or the like. It is believed obvious that if desired, the piston may be dispensed with and ordinary mechanical means substituted for effecting a movement of the rod 31.

It is believed obvious that the device may be built into the shield when the hood 11 is used, or used as an attachment for mounting thereon after the hood 11 has been fabricated. It is also believed obvious that the mechanism may not be limited for use on a welding hood but may be used on the hand shields as well. In the illustration, the hood 11 serves merely as a support for the frame and the operating mechanism.

While we have illustrated and described the preferred form of construction, we do not wish to limit ourselves to the precise details of structure shown, but desire to avail ourselves of such variations and modifications as may come within the scope of the appended claims.

What we claim as new is:

1. A shielding device of the class described, comprising: a supporting frame; a transparent closure in said frame; a swingable frame swingably mounted on said supporting frame; a translucent closure for said swingable frame; and pneumatic means for swinging said swingable frame from one position to another including a toggle mechanism for locking said swingable frame in one position.

2. A shielding device of the class described, comprising: a supporting frame; a transparent closure in said frame; a swingable frame swingably mounted on said supporting frame; a translucent closure for said swingable frame; and pneumatic means for swinging said swingable frame from one position to another including a toggle mechanism for locking said swingable frame in one position and a second toggle mechanism for locking said frame in another position.

3. A device of the class described, comprising: a supporting frame; a swingable frame swingably mounted on said supporting frame and swingable to open and closed positions; a toggle mechanism connected with said supporting frame and with said swingable frame, said toggle mechanism comprising a plurality of cooperating toggles, one of said toggles moving past dead center upon swinging of said swingable frame to open position for locking the same in open position, and one of said toggles swinging past center upon swinging of said swingable frame to closed position for locking said frame in closed position; and pneumatic means for operating said toggle mechanism.

4. A device of the class described, comprising: a supporting frame; a swingable frame swingably mounted on said supporting frame and swingable to open and closed positions; a toggle mechanism connected with said supporting frame and with said swingable frame, said toggle mechanism comprising a plurality of cooperating toggles, one of said toggles moving past dead center upon swinging of said swingable frame to open position for locking the same in open position, and one of said toggles swinging past center upon swinging of said swingable frame to closed position for locking said frame in closed position; a cylinder; a piston slideably mounted in said cylinder; means for connecting said piston to one end of said toggle mechanism; and a conduit for delivering fluid to said cylinder for moving said piston in either direction in said cylinder, the movement of said piston in one direction effecting a swinging of said swingable closure to open position, the movement of said piston in the opposite direction effecting a swinging of said swingable closure to closed position.

5. A shielding device of the class described, comprising: a supporting frame; a swingable frame swingably mounted on said supporting frame and swingable into open position and into closed position; a translucent closure for said swingable frame; and pneumatic means for swinging said swingable frame from open position to closed position and from closed position to open position and including a toggle mechanism for releasably locking said swingable frame in open position and in closed position.

6. A device of the class described, comprising: a welding hood having an opening formed therein; a transparent closure fixed over said opening; a swingably mounted frame carried by said hood and swingable into position over said opening; a translucent closure for said swingable frame; and pneumatic means for swinging said swingable frame from one position to another including a toggle mechanism for locking said frame in one position.

7. A device of the class described, comprising: a welding hood having an opening formed therein; a swingably mounted frame carried by said hood and swingable into position over said opening; a translucent closure for said frame; and pneumatic means for swinging said frame from one position to another including a toggle mechanism for locking said frame in one position.

WILLIAM OTTO RIENACKER.
ARCHIE L. PERRIGO.